United States Patent

Champ et al.

[15] 3,640,714

[45] Feb. 8, 1972

[54] METHOD FOR POSTING INTELLIGENCE ON DIAZO SENSITIVE MICROFICHE

[72] Inventors: Robert B. Champ, San Jose, Calif.; Henry A. Jurgens, Boca Raton, Fla.; James O. Thompson, Los Gatos, Calif.

[73] Assignee: International Business Machines Corporation, Armonk, N.Y.

[22] Filed: Mar. 13, 1969

[21] Appl. No.: 806,965

[52] U.S. Cl. ....................96/49, 96/27, 96/75, 96/46, 96/83, 117/34, 235/61.12

[51] Int. Cl. ....................G03c 5/18, G03c 5/34

[58] Field of Search ....................96/27, 49, 75, 83, 28, 46; 235/61.12; 95/1; 117/34, 40, 156

[56] References Cited

UNITED STATES PATENTS

| | | | |
|---|---|---|---|
| 2,409,564 | 10/1946 | Heinecke et al. | 96/83 |
| 2,528,395 | 10/1950 | Slifkin | 96/75 |
| 3,408,192 | 10/1968 | Aebi | 96/49 |
| 3,418,119 | 12/1968 | Schwartz et al. | 96/27 |
| 3,484,241 | 12/1969 | Evleth et al. | 96/49 |

*Primary Examiner*—Charles L. Bowers, Jr.
*Attorney*—Sughrue, Rothwell, Mion, Zinn & Macpeak

[57] ABSTRACT

A method for preparing fiche cards wherein a sensitized diazo coating containing a thermoplastic resin is adhered to a portion of the fiche of the card through pressure and at temperatures substantially above room temperature, exposed to actinic radiation and developed, and wherein additional pieces of information are posted onto the fiche by adhering additional sensitized diazo coatings to different portions of the fiche and exposing and developing said additional coatings without affecting the earlier developed coatings. Also, a method for preparing fiche cards wherein the fiche is a photosensitive film which is partially imaged and developed such that the remaining portion of the fiche is simultaneously desensitized and wherein additional pieces of information can be posted by adhering coatings of a photosensitive material to portions of the desensitized film and thereafter imaging and developing.

28 Claims, 3 Drawing Figures

*INVENTORS*
ROBERT B. CHAMP
HENRY A. JURGENS
JAMES O. THOMPSON

METHOD FOR POSTING INTELLIGENCE ON DIAZO SENSITIVE MICROFICHE

BACKGROUND OF THE INVENTION

1. Field of the Invention

This invention relates generally to information storage cards and, more particularly, to fiche cards and microfiche cards.

2. Description of the Prior Art

Fiche cards are information storage cards which use visible or detectable images as the means of information storage. Most commonly, these images are in the form of micro images and information retrieval is facilitated by the use of a conventional microfilm readout device. These types of cards generally comprise a transparent film known as a "fiche" onto which pieces of information may be posted or recorded by creating images on radiation sensitive substrates.

Any type of information may be stored on microfiche cards, such as documentary, pictorial or technical information. Likewise, the information may be digital or other coded symbols or may be templates for the fabrication of microcircuits, etc.

The more common type of information storage card, as known in the prior art, are aperture cards which are prepared by providing a series of suitably spaced apertures in a self-supporting frame structure into which bits of microfilm may be mounted. Another type of prior art information storage-type card is disclosed in U.S. Pat. No. 3,373,265. According to that disclosure, a record card is provided containing rows and columns of frames of information. The sensitized film, carried in these frames are imaged and developed prior to being transferred to the card and are adhered to the substrate of the card with the image side immediately adjacent to the substrate. If the image side is at the surface of the card, it creates an undesirable relief pattern from which it is difficult to generate copies for information readout. The technique of this reference is inadequate to permit the posting of additional pieces of information once a developed image has been provided thereon, since if the image being transferred to the card is placed face down against the existing image, it would be a wrong reading or reverse image as compared with the original right reading or positive image.

True posting capability implies that the image initially placed on the fiche be capable of being viewed, copied or otherwise handled or processed in a microsystem over prolonged periods of time without rendering the unimaged portions unusable for future posting. Inherent in the concept of true posting capability is the requirement that the quality of the processed image be equivalent to that of the original image and that the posted image be capable of being viewed or copied with equal facility and clarity as the original image. Conventional fiche cards, however, do not meet these requirements due to the rapid rate of decomposition of the photosensitive layer on exposure to ambient light.

A number of approaches to image posting have been proposed in the past, but all suffer a number of serious limitations which prevent true posting capability. According to one of these techniques, the original fiche is protected or masked on both sides from unwanted actinic radiation by a peelable coating, that is, a pigmented paper or ultraviolet absorbing plastic film, etc. This protective coating is suitably scored or perforated so that it may be removed a section at a time as desired for exposure and development of a portion of the fiche. Exposure and imaging of the fiche are therefore accomplished in a stepwise fashion. Not only is this technique cumbersome from the point of view of handling and processing, but this technique frequently results in some degree of "-precoupling" in the protected areas over prolonged periods of time.

An alternative approach, as suggested in the prior art, is the use of transparent "sleeves" or "jackets" on a transparent substrate which holds individual bits of strips of posted information. The information to be posted is exposed and developed on conventional film materials of suitable size and is physically inserted in the sleeves or jackets as desired. This approach, however, results in a fiche of undesirable increased thickness which complicates the handling and processing of the final product.

It is, therefore, an object of this invention to provide a fiche which has true posting capabilities and which does not lose these capabilities over prolonged periods of time in storage. It is further an object of this invention to provide a fiche card from which the imaged information can be retrieved with equal clarity regardless of the time at which the image is posted. Another object of this invention is to provide microfiche cards wherein the images thereon are microimages. A further object is to provide fiche cards which are easily handled and processed.

SUMMARY OF THE INVENTION

These and other objects are herein obtained by providing an information storage card whereby a sensitized diazo coating is adhered to a substrate, exposed to actinic radiation in a suitable pattern corresponding to the information intended to be stored on said substrate, and developed. Additional items of intelligence can be applied to the substrate by applying an additional sensitized diazo coating to another portion of the same substrate which is thereafter treated in the same manner. This process is repeated as often as is necessary until as many separate pieces of information are posted as desired or until the entire substrate contains exposed and developed images.

DESCRIPTION OF PREFERRED EMBODIMENTS

Figure 1:
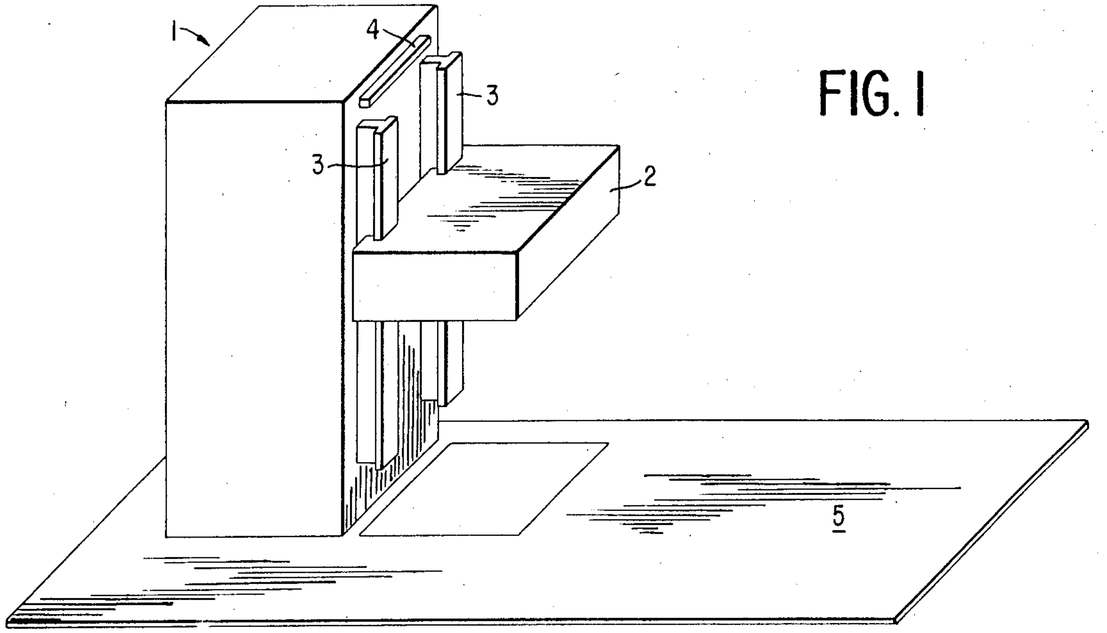
FIG. 1 is a schematic diagram of one technique for applying photosensitive coatings to the fiche whereby chips of a transfer film having a photosensitive coating thereon is adhered to the fiche by means of a thermotransfer plate.

According to the present invention, an information storage card is provided by the method of adhering a sensitized diazo coating to the substrate of the card, hereinafter called the "-fiche," exposing said coating to actinic radiation in a pattern corresponding to the information intended to be stored on the card and thereafter developing said coating without affecting any previous images already on the card.

The fiche may be composed of any film-forming material, such as a plastic film, such as polyethylene terephthate or cellulose acetate, paper, glass, metal foil or the like, preferably of a thickness of between 5–7 mils. The fiche may be mounted onto any suitable frame for added support or may be self-supporting. If desired, the fiche may be combined with any other information storage structure such as a computer keypunch card.

When the information storage card of the present invention is combined with a computer keypunch card, one portion of the card body is a fiche as disclosed herein and the second portion is a punch-card capable of receiving coded intelligence.

The sensitized diazo coating is formed by the admixture of a diazonium salt, at least one coupler, at least one stabilizer and at least one thermoplastic resin, capable of being adherently bound to the fiche. Any conventional diazo salt can be used in preparing this admixture. For example, suitable salts include paramorpholino benzene diazonium tetrafluoroborate, paradiethylamino-2-ethoxy benzene diazonium tetrafluoroborate, 2,5-diethoxy p-morpholino benzene diazonium tetrafluoroborate, p-dimethylamino benzene diazonium tetrafluoroborate and the zinc chloride salts thereof.

One or more couplers such as 3,5-dihydroxy-N-hydroxyethyl benzamide, m,m'-ethylene dioxy diphenol, a brown-yellow coupler and 2,3-dihydroxy-6-sulfonic acid naphthalene, a blue coupler.

The coupler may be used in a quantity of between 5 percent and 200 percent and preferably between 100 percent and 200 percent by weight based on the weight of the diazonium salt.

Since the coupler and the salt are in contact, one or more stabilizers are required to prevent premature developing. Any conventional stabilizer can be used within the context of the present invention. For example, suitable stabilizers include hydroxy carboxylic acids as citric acid; dicarboxylic acids such as tartaric acid. Other suitable stabilizers include the aryl sulfonic acids such as 1, 3, 6-napthalene trisulfonic acid. Depending on the particular stabilizer and particular diazo salt, the stabilizer should be present in an amount of between 5 and 200 percent and preferably between 100 percent and 200 percent based on the weight of the diazonium salt.

The selection of the thermoplastic resin is dependent upon the particular fiche onto which the diazonium coating is to be applied. Suitable thermoplastic resins found to be operable herein include polyvinyl acetate, vinyl acetate-vinyl chloride copolymer, copolymers of the esters of acrylic acid and methacrylic acids, cellulose acetate, cellulose acetate-butyrate and polyvinylidene chloride. Only a sufficient quantity of thermoplastic resin need be used to adhere the diazo to the fiche.

The method of mixing the components of the coating is not critical and is usually prepared by adding the coupler or couplers to the resin-solvent mixture while stirring. The stabilizer is then added and dissolved followed by the diazonium salt or salts addition and dissolution prior to coating.

A wide variety of solvents can be used in preparing the admixture depending on the particular thermoplastic resin used. Naturally, the solvent should be nonreactive with any of the other components of the salt and should not affect the substrate onto which the coating is subsequently applied. When polymethyl methacrylate is used as the resin, methanol has been found to be a suitable solvent. Where the thermoplastic resin is polyvinylidene chloride the solvent may be methyl ethyl ketone. The admixture may be directly coated onto the fiche, dried and treated according to the methods of the present invention. If subsequent pieces of intelligence are desired to be posted onto the fiche, however, it is usually not desirable to apply diazo coating directly to the fiche since it could adversely affect the earlier formed images. It is another aspect of the present invention therefore to apply the admixture to a transfer film which is thereafter applied to the fiche. According to this technique, the coating is applied to a film capable of being wetted by said coating but to which the coating is poorly adherent upon drying. Suitable films include such plastic films as Dupont 5 mil of unsubbed polyethylene terephthalate, cellulose acetate, cellulose acetate butyrate, polycarbonate and Dupont Kapton polyimide.

The coating may be dried by removing the solvent by means of a simple heat or vacuum distillation. If the dried coating is too greatly adherent to the film, a small quantity of a release agent should be applied to the film preferably in an amount of no greater than a few microns prior to receiving the coating. If such a release agent is used it must by carefully selected so that the film remains capable of being wetted by the coating solution. A wide variety of release agents may be used depending on its compatibility with the particular resin system. For acyloid resins, carnauba wax or fatty acids such as palmetic or stearic acid function well.

The transfer film containing the diazo coating is applied to the fiche by contacting the coated side of said film with said fiche and the actual transfer of the coating is effected by the application of heat and pressure. Generally, temperatures of between about 100° F. and 300° F. are adequate for this purpose depending on the particular coating composition. Pressure may be applied by any conventional means, such as by roll action or the like and the amount of pressure applied to the transfer film need only be adequate to effect close contact of the coating with the fiche.

Upon the combined application of heat and pressure, the thermoplastic resin softens to an adhesivelike state and the coating tends to be firmly and uniformly bound to the fiche. When roll action is used to provide pressure, its shearing effect not only provides the required pressure, but also acts to eliminate air bubbles formed between the fiche and the transfer film. Upon subsequent cooling to below the softening temperature of the thermoplastic, an adherent bond is obtained. Since the transfer film has been selected for its poor adhesiveness with the film, it can be readily stripped from the coating without affecting the bond. If necessary, a small amount of heat can be applied to the fiche-coating-transfer film composite to disengage the transfer film without affecting the underlying coating.

The fiche is now in condition to be exposed to the actinic radiation in order to receive a latent image. In exposing the fiche, any type of radiation which will enable the formation of a latent image can be used. For example, ultraviolet light, visible light, infrared light or in special circumstances and depending on the particular diazonium salt used, high energy ionizing radiation such as X-ray radiation can be used. The suitable pattern for forming the latent image may be obtained by reflecting the desired intelligence from an original onto the coating. Another method, however, is to pass light through a transparency of the original intelligence so as to form a correct reading image. Two further methods can be used for forming the initial image when using a transparency as the original. One is a contact exposure wherein the coating is in contact with the original during the exposure. The second is to expose the coating to an original through a system of lenses, which provides good control of the size of the image.

One of the advantages of the present invention is that those portions of the fiche, not coated with the sensitized diazo layer are unaffected by the light exposure and no special precautions need be taken to mask the remaining portions from extraneous light. Moreover, the latent image can be developed in such a manner that the previously formed images on the fiche remain unaffected. These advantages are obtained by applying fresh layers of diazo coatings to separate portions of the fiche, so as not to overlap the previously formed images. A number of techniques are available to accomplish this transfer. One such technique is shown in FIG. 1. In this method a container 1 is provided to store chips of the treated transfer film. A thermotransfer plate 2 is attached to said chip container and is vertically movable along tracks 3. A means (not shown) for moving the thermotransfer plate, such as a pulley, or a worm gear, is suitably mounted to affect vertical motion. The plate may contain a set of electrical resistors to provide the heat necessary to accomplish the coating transfer. A treated chip is transferred from the chip container into the thermotransfer plate by a simple manual or automated feed system 4 and the fiche is appropriately positioned by a manual or automated indexing stage. The actual transfer is effected by bringing the plate into contact with the fiche so that the coating is brought into contact with the fiche surface at a suitable temperature and at suitable pressure.

Figure 2:
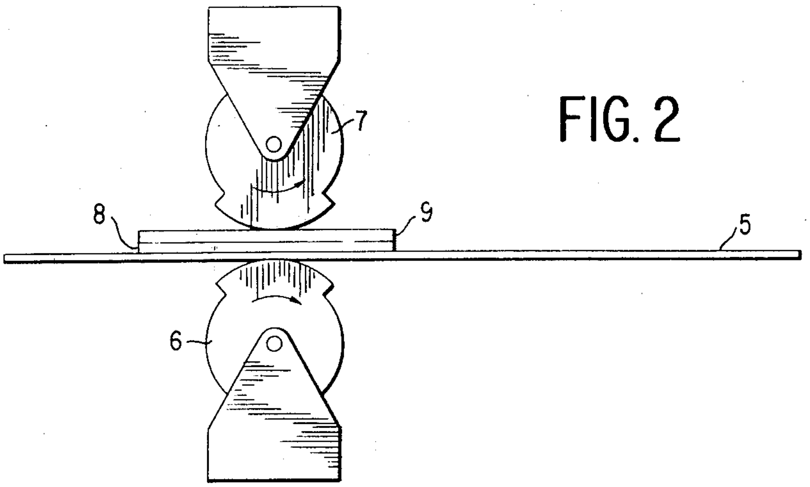
FIG. 2 is a schematic diagram of another technique for applying photosensitive coatings to the fiche whereby chips of a transfer film are adhered to the fiche by means of a pair of opposing rollers.

A second technique for effecting transfer of the coating without affecting previously formed images is shown in FIG. 2. According to this technique, the fiche 5 is provided between a pair of opposing hot rollers 6 and 7. A coated transfer film 8 is brought into contact with the fiche by its coated side 9 and the required pressure and temperature are obtained by the action of the hot rollers.

Figure 3:
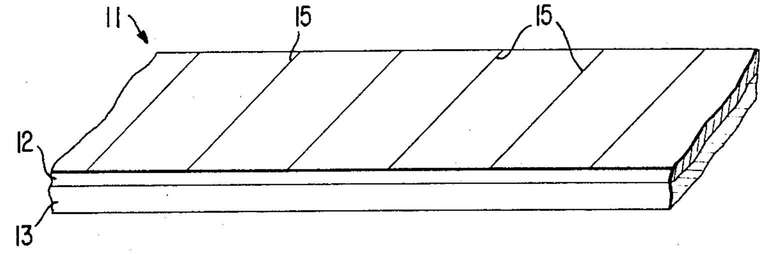
FIG. 3 is another schematic diagram of a roll of transfer film.

If desired, a roll of sensitized film 11 can be provided rather than chips of coated film, as shown by FIG. 3. The diazo layer is coated onto a substrate 13. In this embodiment, a fiche is provided with a suitable diazo coating thereon. The film is scored 15 at certain predetermined dimensions to enable easy cutting and an apparatus, similar to that shown in FIG. 1, can be used to cut the diazo coated film strip and to contact the film with the fiche.

It has been found that one of the best methods for developing the latent image is by the use of hot aqua or high-pressure ammonia; according to the hot aqua technique, ammonium hydroxide is heated, giving off ammonia gas. When the film is passed through these vapors, the coupling reaction occurs and the desired image is formed. According to the high-pressure technique, ammonia gas is under pressure in a cylinder and is metered out by means of a pressure head designed to fully develop the image.

Another aspect of the present invention is the use of a light sensitized film as the fiche. According to this aspect, a portion of the sensitized fiche is exposed to light in a suitable pattern corresponding to the information intended to be stored, while simultaneously burning out or desensitizing the remaining portions of the fiche. Additional pieces of information are thereafter posted to the fiche in accordance to the techniques disclosed above.

This invention may best be understood by reference to the following examples which are presented for purpose of illustration only and are not intended to be limiting in any manner.

EXAMPLE 1

Eighteen cubic centimeters of 1 percent cellulose acetate butyrate in a solution of methyl ethyl ketone is admixed with 7 cc. of 4 percent polyvinyl acetate in methyl ethyl ketone. To this combination of solvents is added with mixing 0.3 grams of citric acid, 1.0 grams of N-B-hydroxyethyl napthamide and 0.5 grams of 2,5 diethoxy P-morpholino benzene tetrafluoroborate. The mixture is stirred to produce a clear solution which is microfiltered to remove all traces of undissolved material and dust. This solution is coated with a meniscus-type coater onto a 5 mil unsubbed polyethylene terephthalate film which has been prewashed with water and acetone in a dustfree environment. The film is dried for 10 minutes at 75° C. and the coating thickness was noted such that the maximum optical density is in the range of 1 to 1.5 in the visible for blue dye. This corresponds to a thickness of about 5 microns. Exposure and developing of the diazo films were accomplished on an IBM Micro Copier II D. To obtain maximum density, the exposure control is turned off and the film is cycled through the machine thereby giving off the maximum dye density. When an original is used, the paper exposure setting is selected and the two cards are placed into the machine. A contact exposure occurs and the diazo latent image is cycled to the high pressure developing setting and developed. Time for development is about 10 seconds to about 15 seconds.

EXAMPLE 2

0.5 cc. of 8 percent Acryloid B-72, a copolymer of acylic esters and methacrylic acids in methyl ethyl ketone is prepared. To this solution is added with stirring, 0.3 grams of sulfosalicylic acid, 1.0 grams of 3,5-diethoxy P-morpholino benzene diazonium tetrafluoroborate and 0.5 grams of N-B-hydroxyethyl napthamide. The clear solution is treated as shown in Example 1.

EXAMPLE 3

A solution of 10 grams of QX2167 Saran vinylidene chloride polymer is dissolved in 46 grams of methyl ethyl ketone, 10 grams of A101 Acryloid resin, a copolymer of acrylic esters and methacrylic acids is dissolved in 50 cc. of methanol. The Acryloid solution is added slowly to the Saran solution with stirring and the mixture is ball milled for 48 hours to disperse the substituents in the solvents. To the ball milled mixture was added $DMBF_4$

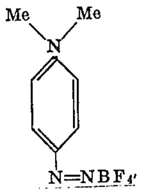

and 11.3 grams of methyl cyanide, and the resultant solution is coated onto precleaned Mylar as described in Example 1 and cured at 180° F. for about 10 minutes. The resins are added so that they will entrap the nitrogen given off during exposure of the diazo to radiation. Subsequent heating expands the gas and provides the vesicular image. The methyl cyanide is used as an appropriate solvent for the diazo in the system.

EXAMPLE 4

If one wishes to add a page of information to a microfiche card, he can do so utilizing the following procedure. The sensitized, unexposed diazonium posting film is affixed by roller heating to the appropriate spot on the microfiche. The diazo support is then stripped away leaving the sensitized diazo coating on the microfiche. This area is then exposed, either by means of contact exposure or through a lens system, to an original, silver or diazo. The subsequent latent image is then developed by means of aqueous ammonia vapors or high-pressure ammonia giving the updated microfiche card. It would be possible to post a microfiche card from start to finish by imaging the diazo posting film and transferring the image to the fiche. This would allow all the images to be right reading.

It should be understood that many modifications of the present invention can be made without departing from the spirit or scope thereof. For example, the fiche may initially be a diazo sensitized substrate onto which a first image is formed by exposing a portion of the film to actinic radiation while simultaneously desensitizing the remaining portion of the film. Subsequent pieces of intelligence can thereafter be applied to the fiche by the techniques previously described.

Moreover, in addition to the range of colored images that can be obtained by the present invention, vesicular images of the Kalvar type may also be posted. The Kalvar process is the utilization of a diazonium salt in a thermoplastic media to provide a subsequent density difference upon exposure to actinic radiation. This system does not use couplers and a dye is not formed. The images can be heat developed and the process can be manipulated by formulating to give either positive or negative images. The diazo, when exposed, liberates nitrogen. This gas is trapped in the thermoplastic resinous binder and when heated, larger bubbles are formed, deforming the resin and giving rise to a density difference.

We claim:

1. A method for preparing fiche cards comprising:

a. adhering with pressure and heat a coating comprising a light-sensitive diazonium compound uniformly dispersed in at least one thermoplastic resin, and carried on a strippable backing, onto at least a portion of the fiche of said card, b. exposing said coating to actinic radiation in a suitable pattern corresponding to the information intended to be stored so as to form a latent microimage, and c. developing said latent microimage to form a true microimage corresponding to said information, said adhering taking place at a temperature above 100° F, whereby upon the application of said heat and pressure said thermoplastic resin softens to an adhesivelike state to bind said coating to said fiche, said fiche on said fiche card capable of receiving additional pieces of information by adhering additional coatings to different portions of the fiche and exposing and developing these additional coatings without affecting the earlier developed coatings.

2. The method of claim 1 wherein a second sensitized diazo coating is adhered to a different portion of said fiche, exposing said second coating to actinic light in a suitable pattern corresponding to the additional information intended to be stored so as to form a latent image and thereafter developing said latent image to form a second true image on said fiche without affecting the first true image.

3. The method of claim 2 wherein a sensitized diazo coating is repeatedly applied to different portions of said fiche, exposed to actinic radiation and developed for as many separate pieces of information as is intended to be stored on said fiche.

4. The method of claim 1 wherein said coating comprises the admixture of a diazonium salt, at least one coupler, at least one stabilizer and at least one thermoplastic resin capable of being adherently bound to said fiche.

5. The process of claim 1 wherein said coating is adhered to a portion of said fiche by the process which comprises coating a solvent containing an admixture of a diazonium salt, at least one coupler, at least one stabilizer and a thermoplastic resin capable of being adherently bound to said fiche, onto a film capable of being wetted by said admixture but to which admixture when dried is poorly adherent, drying said admixture by removing said solvent, contacting said dried admixture with a portion of said fiche while applying heat and pressure so that the thermoplastic in said admixture is adhered to said fiche and removing said film so as to provide a sensitized diazonium coating on said fiche.

6. The method of claim 1 wherein said fiche is an optically clear plastic film of polyethylene terephthalate of a thickness of between 5 to 7 mils.

7. The method of claim 1 wherein the actinic radiation is visible light which is passed through a silver original obtaining said information so as to provide said radiation pattern for exposure of the coating.

8. The method of claim 1 wherein said image is developed with ammonia gas.

9. The method of claim 1 wherein said fiche is of a thickness of between 5 and 7 mils.

10. The method of claim 1 wherein said coating further contains, in admixture, at least one coupler and at least one stabilizer, and wherein said diazonium compound is a member selected from the group consisting of tetrafluoroborate salt or zinc chloride salt of paramorpholino benzene diazonium, para-diethylamino-2-ethoxy benzene diazonium 2,5-diethoxy-p-morpholino benzene diazonium, p-dimethylamino benzene diazonium.

11. The method of claim 10 wherein said coupler is a member selected from the group consisting of 3,5-dihydroxy-N-hydroxyethyl benzamide, m,m'-ethylene dioxy diphenol, and 2,3-dihydroxy-6-sulfonic acid naphthalene.

12. The method of claim 10 wherein said coupler is employed in a quantity of from 5 percent to 200 percent by weight based on the weight of said diazonium salt.

13. The method of claim 12 wherein said coupler is employed in a quantity of from 100 percent to 200 percent by weight based on the weight of the diazonium salt.

14. The method of claim 10 wherein said stabilizer is a member selected from the group consisting of hydroxy-carboxylic acids, dicarboxylic acids, and aryl sulfonic acids.

15. The method of claim 14 wherein said hydroxy-carboxylic acid is citric acid, said dicarboxylic acid is tartaric acid, and said aryl sulfonic acid is 1,3,6-napthalene trisulfonic acid.

16. The method of claim 1 wherein said stabilizer is present in an amount of from 5 percent to 200 percent by weight of the diazonium salt.

17. The method of claim 16 wherein said stabilizer is present in an amount of from 100 percent to 200 percent by weight of the diazonium salt.

18. The method of claim 1 wherein said thermoplastic resin is a member selected from the group consisting of polyvinyl acetate, vinyl acetate-vinyl chloride copolymer, copolymers of the esters of acrylic acid and methacrylic acids, cellulose acetate, cellulose acetate-butyrate and polyvinylidene chloride.

19. The method of claim 1 wherein said adhering temperature ranges from about 100° to about 300° F.

20. A method for preparing a microfiche card which comprises:

a. exposing a portion of a sensitized diazo coating on said microfiche to actinic radiation in a suitable pattern corresponding to the information intended to be stored, thereby forming a latent microimage, while simultaneously permitting the remaining portions of said microfiche to be desensitized,
b. developing said latent microimage so as to provide a true microimage,
c. adhering with pressure, a coating onto another portion of said fiche, said coating being carried on a strippable backing and comprising a light-sensitive diazonium compound uniformly dispersed in at least one thermoplastic resin, said adhering being at a temperature above about 100° F, whereby upon the application of said heat and pressure said thermoplastic resin softens to an adhesivelike state to bind said coating to said fiche,
d. exposing said sensitized diazo coating to actinic radiation in a suitable pattern so as to form a second latent microimage corresponding to said additional information,
e. developing said latent microimage to form a true microimage, and
f. repeating steps (c) to (e) for as many separate pieces of information as are intended to be stored on said fiche or until all available portions of said fiche are filled.

21. The method of claim 20 wherein said adhering temperature ranges from about 100° to about 300° F.

22. The method of claim 20 wherein said thermoplastic resin is a member selected from the group consisting of polyvinyl acetate, vinyl acetate-vinyl chloride copolymer, copolymers of the esters of acrylic acid and methacrylic acids, cellulose acetate, cellulose acetate-butyrate, and polyvinylidene chloride.

23. The method of claim 20 wherein said fiche is a member selected from the group consisting of polyethylene terephthalate, cellulose acetate, paper, glass, and metal foil.

24. The method of claim 20 wherein said fiche has a thickness of between 5 and 7 mils.

25. A method for preparing microfiche cards comprising:

a. adhering with heat and pressure, a coating carried on a strippable backing, said coating comprising a light-sensitive diazonium compound uniformly dispersed in at least one thermoplastic resin selected from the group consisting of polyvinyl acetate, vinyl acetate-vinyl chloride copolymer, copolymers of the esters of acrylic acid and methacrylic acids, cellulose acetate, cellulose acetate-butyrate, and polyvinylidene chloride, onto at least a portion of the fiche of said card; and stripping said backing from said coating,
b. exposing said coating to actinic radiation in a suitable pattern corresponding to the information intended to be stored so as to form a latent microimage, and
c. developing said latent microimage to form a true microimage corresponding to said information, said adhering taking place at a temperature of from about 100° to about 300° F., said microfiche capable of receiving additional pieces of information by adhering additional sensitized diazo coatings to different portions of said fiche and exposing and developing these additional coatings without affecting the earlier developed coatings.

26. A method for preparing a microfiche card which comprises:

a. exposing a portion of a sensitized diazo coating on said fiche to actinic radiation in a suitable pattern corresponding to the information intended to be stored, thereby forming a latent microimage, while simultaneously permitting the remaining portions of said fiche to be desensitized.
b. developing said latent microimage so as to provide a true microimage.
c. adhering with pressure a coating containing a light-sensitive diazonium compound dispersed in at least one thermoplastic resin selected from the group consisting of polyvinyl acetate, vinyl acetate-vinyl chloride copolymer, copolymers of the esters of acrylic acid and methacrylic acids, cellulose acetate, cellulose acetate-butyrate, and polyvinylidene chloride, onto another portion of said fiche; said coating being carried on a strippable backing which is stripped from said coating after said adhering,
d. exposing said coating to actinic radiation in a suitable pattern so as to form a second latent microimage corresponding to said additional information,
e. developing said latent microimage to form a true microimage, and f. repeating steps (c) to (e) for as many separate pieces of information as are intended to be stored on said microfiche or until all the available portions of said microfiche are filled, said adhering in step (c) taking place at a temperature of from about 100° to about 300° F.

27. The process of claim 25 wherein said coating further contains, in addition to said at least one thermoplastic resin and said diazonium compound, which is a diazonium salt, from 100 to 200 percent by weight of a coupler and from 100 to 200 percent by weight of a stabilizer for said diazonium salt and said coupler, said percentages being based on the weight of the diazonium salt.

28. The process of claim 26 wherein said coating further contains, in addition to said at least one thermoplastic resin and said diazonium compound, which is a diazonium salt, from 100 to 200 percent by weight of a coupler and from 100 to 200 percent by weight of a stabilizer for said diazonium salt and said coupler, said percentages being based on the weight of the diazonium salt.

* * * * *